UNITED STATES PATENT OFFICE 2,060,461

BUBBLE CHEWING GUM AND PROCESS OF MAKING SAME

Richard P. Dyckman, Orange, N. J., assignor to L. A. Dreyfus Company, a corporation of New York No Drawing. Application May 23, 1935, Serial No. 23,019

15 Claims. (Cl. 99—135)

This invention relates to chewing gum and its preparation and more particularly to that species of chewing gum known as "bubble" gum which has sufficient tenacity to permit one to blow a film of the same into the form of a bubble. An object of the invention is to provide a chewing gum of this class flavored with peppermint, spearmint and certain other flavoring essences that heretofore could not be used successfully because of their deleterious effect on the product.

Chewing gum, as prepared for the customer, consists essentially of a chewable base to which is added a considerable proportion of glucose and confectioner's sugar with added flavoring matter, natural or synthetic, to give the desired taste.

A chewing gum base must have certain clearly defined characteristics. In addition to being odorless and tasteless the base material must be plastic, capable of stretching to a certain extent, insoluble in the liquids of the mouth and must not be sticky or adhere to the teeth. Under conditions of temperature and moisture encountered in the mouth the base material must maintain its desired consistency and, in particular, must not soften materially.

Bubble gum differs from ordinary chewing gum in that the base from which it is made must have increased tensile strength and a greater degree of elasticity. The base used for ordinary chewing gum is plastic and has a certain degree of ductility, but substantially no elasticity. Bubble gum base on the other hand must have sufficient tenacity or tensile strength to permit its being blown out into a thin film by application thereto of the breath of the person chewing the same.

Among the natural essential oils that have customarily been added to chewing gum in its final preparation to give desired flavor, are peppermint, spearmint, wintergreen, birch, cassia, cloves, anise, ginger, lemon and orange. Of these the favorite flavors are peppermint and spearmint. While these two flavors have been satisfactorily used in connection with ordinary gum, it has been found impracticable to use the same in connection with bubble gum and this is also true to a considerable extent with lemon and orange. It has been found that the addition to properly prepared bubble gum of the essential oils of peppermint, spearmint, lemon or orange results in an early degradation of the chewing gum base that renders the gum so soft and plastic that it no longer has the tenacity and degree of elasticity necessary for proper manipulation of bubble gum. On the other hand, the essential oils of cassia, birch and certain other flavors that are not commonly used do not cause the degradation of the base that renders it unsuitable for bubble gum use.

This invention has to do primarily with the use of the so-called "natural" essential oils used for flavoring purposes as distinguished from synthetic flavoring extracts, as to which special conditions are present requiring special consideration in each case. The natural essential flavoring oils are composed of complex substances, including a substantial percentage of the flavoring matter itself, a considerable percentage of terpenes and the balance a mixture of substances of complex composition mainly. My investigations have disclosed the fact that the terpenes present in many of the natural essential oils, particularly peppermint, spearmint, lemon and orange, are the chief factors in the degradation of the chewing gum base. I have found, for example, that the addition to a properly compounded bubble gum base of the terpenes present in the essential oil of peppermint and the essential oil of spearmint, as commonly marketed, causes a marked swelling and softening of the base, which causes the gum to be soft, lifeless, sticky and without resilience, tensile strength or capability of stretching. These terpenes belong to a class of compounds generally designated by the chemical formula $C_{10}H_{16}$. They are found naturally in a wide variety of products from plants and trees, particularly evergreens from which are derived resinous products. For example, they form a large percentage of turpentine. They are colorless liquids boiling in a range of from approximately 150° to 180° centigrade, and have a characteristic aromatic odor, which is, however, dependent to some degree upon the source of the terpenes. They are good solvents for most resins and gums. The terpenes found in connection with essential oils of peppermint, spearmint, lemon and orange, are substantially tasteless and inert from the standpoint of flavoring but have been proved by my investigations to be an active cause of the injurious effects upon the bubble gum base.

I, therefore, propose to use for flavoring bubble gum, the essential oils of peppermint and spearmint and, where desirable, lemon, orange and other flavors from which the terpenes have been removed. The removal of such terpenes can be accomplished by fractional distillation. A suitable method employed to remove the terpenes from peppermint and spearmint oils is by fractional distillation, preferably in a vacuum. The first fraction to be distilled, consisting of approximately 40% of the total volume, will contain the terpenes originally present in the peppermint and spearmint oils. The next fraction, consisting of 50% of the total, will be the pure terpeneless oil. The remaining 10% will consist substantially of the essential oil and impurities and some resin or gum that will remain in the distilling flask. Temperatures at which these fractions are distilled from the peppermint or spearmint oil will naturally depend upon the degree of vacuum under which distillation takes place. At atmospheric pressure the terpenes will begin to distill at approximately 140° centigrade. The vacuum temperatures at which they begin to distill will be below this temperature. This fractional distillation for the purpose of eliminating the terpenes should not be confused with the common practice of steam distillation to which peppermint, spearmint and other essential oils are subjected to produce double and triple distilled oils. Steam distillation removes none of the terpenes but does remove some of the additional substances contained in the ordinary essential oils, leaving a slightly more concentrated oil composed of the flavoring matter and the terpenes. In carrying out my invention in its preferred form I propose to remove by fractional distillation substantially all of the terpenes from the essential oils above-mentioned, or, I may employ terpeneless essential oils which may be obtained on the market.

When terpeneless essential oils of peppermint, and spearmint are added to the properly prepared bubble gum, the degrading effect of the essential oil upon the base is materially lessened and substantially eliminated, as compared with the effect produced when ordinary peppermint and spearmint oil containing terpenes is added.

As a general thing, and particularly in the case of peppermint, spearmint, lemon and orange, the terpenes which are present in these essential oils or ordinarily sold will produce the swelling and degrading effects above-mentioned and render the chewing gum base unsatisfartory for bubble gum purposes and the elimination of the terpenes in these cases will, to a large extent, prevent such deleterious effect of the essential oil upon the base.

I have found, however, that the other substances contained in the ordinary essential oils, particularly of peppermint, spearmint, lemon and orange, including the flavoring substances themselves, have a certain degree of softening and disintegrating effect upon the ingredients ordinarily employed in the making of a chewing gum base. Other ingredients of the essential oils than the flavoring matter have been found by me to be more active in this softening effect upon the base than the flavoring matter itself. Hence, if a concentrated flavoring extract be used from which the terpenes have been removed and from which the other ingredients above referred to have also been substantially removed, the softening effect upon the base will be correspondingly reduced. I have also found that certain non-flavoring substances, such as ethyl alcohol, not only cause no deterioration of the bubble base but when added to the essential oil used for flavoring, particularly a terpeneless oil such as the terpeneless peppermint oil above suggested, will lessen the softening or other deterioration of the chewing gum base to which the flavoring oil is added. In the preferred form of my invention, therefore, I propose using a concentrated form of peppermint, spearmint, lemon or orange oil from which the terpenes have been removed and to which an alcohol of the aliphatic series not deleterious to human beings (such, for example, as ethyl alcohol) has been added in an amount substantially equal to the terpenes and other ingredients that have been removed from the essential oils.

My invention thus covers the use of terpeneless flavoring oils, particularly peppermint, spearmint, lemon and orange, for flavoring bubble gum. It also contemplates, where desired, the use of a concentrated form of the essential oil used for flavoring and also, where desired, the use of an innocuous substitute, such as ethyl alcohol, for the terpenes and other ingredients removed from the essential oil.

An example of a satisfactory finished bubble gum made in accordance with my present invention is as follows:

|  | Parts |
|---|---|
| Bubble gum base | 4–6 |
| Glucose | 7–10 |
| Confectioner's sugar | 24–30 |
| Flavoring | ½–1 | such flavoring consisting of an extract of peppermint oil from which the terpenes (amounting ordinarily to about 40%) have been substantially removed and a corresponding percentage of ethyl alcohol substituted.

I do not, however, wish to be limited to such formula, with respect to the finished chewing gum, or the particular composition of the flavoring extract; this formula being given only by way of example and being subject to such modifications as would occur to and meet with the judgment or experience of those familiar with the manufacture of chewing gum.

What I claim as my invention is set forth as follows:

1. The process of making bubble chewing gum which comprises the steps of providing a suitable base, adding thereto a sweetening material and a flavoring of natural essential oil which in its natural state contains terpenes, and pretreating the oil before adding the same to the base to remove substantially all of the terpenes.

2. The process of making bubble chewing gum which comprises the steps of providing a suitable base, adding thereto a sweetening material and a flavoring of natural essential oil which in its natural state contains terpenes, pretreating the oil before adding the same to the mixture to remove substantially all of the terpenes, and replacing the terpenes thus removed with ethyl alcohol.

3. The process of making bubble chewing gum which comprises the steps of providing a suitable base, adding thereto a sweetening material and a flavoring of essential oil which in its natural state contains ingredients deleterious to the base, and materially lessening the proportion of said ingredients prior to adding the oil to the mixture by subjecting the oil to fractional distillation.

4. The process of making bubble chewing gum which comprises the steps of providing a suitable base, adding thereto a sweetening material and a flavoring of essential oil which in its natural state contains ingredients deleterious to the base, lessening the proportion of said ingredients prior to adding the oil to the mixture by distilling the oil in a partial vacuum and thinning the concentrated flavoring thus obtained with alcohol not deleterious to human beings.

5. A bubble chewing gum composed of a chewable base, sweetening matter, and a flavoring, said flavoring comprising an oil of the group consisting of the natural essential oils of peppermint, spearmint, lemon and orange, substantially free from substantially all of the normal content of terpenes.

6. A bubble chewing gum composed of a chewable base, sweetening matter, and a flavoring, said flavoring consisting of an oil of the group consisting of the natural essential oils of peppermint, spearmint, lemon and orange, substantially free from substantially all of the normal content of terpenes, and an alcohol of the aliphatic series not deleterious to human beings to replace the terpenes.

7. A bubble chewing gum composed of a chewable base, sweetening matter, and flavoring, said flavoring comprising an oil of the group consisting of the natural essential oils of peppermint, spearmint, orange and lemon substantially free from substantially all of its normal content of terpenes, and ethyl alcohol to replace the terpenes.

8. A bubble chewing gum comprising 4 to 6 parts of a chewable base having a high degree of tensile strength sufficient to permit of blowing a film of the same into the form of a bubble, 30 to 40 parts of sweetening matter, and ½ to 1 part of flavoring, said flavoring consitsting of an oil of the group consisting of the natural essential oils of peppermint, spearmint, orange and lemon, substantially free from substantially all of the normal content of terpenes thereof, and ethyl alcohol to replace the terpenes.

9. A bubble chewing gum comprising 4 to 6 parts of a chewable base having a high degree of tensile strength sufficient to permit of blowing a film of the same into the form of a bubble, 7 to 10 parts of glucose, 24 to 30 parts of confectioner's sugar, and ½ to 1 part of flavoring, such flavoring consisting of a concentrated extract of a natural essential oil of the group consisting of peppermint, spearmint, orange and lemon, substantially free from substantially all the terpenes thereof and an alcohol of the aliphatic series not deleterious to human beings.

10. In the process of making bubble chewing gum, the step which comprises adding to a bubble chewing gum base, a flavoring of essential oil, which in its natural state contains terpenes having a deleterious action on said base, of terpene content below that causing substantial deterioration of said base.

11. In the process of making bubble chewing gum, the step which comprises adding an alcohol not deleterious to human beings to a bubble chewing gum base.

12. In the process of making bubble chewing gum, the step which comprises adding to a bubble chewing gum base an alcohol not deleterious to human beings, and a flavoring of essential oil which in its natural state contains terpenes having a deleterious action on said base, of terpene content below that causing substantial deterioration of said base in the presence of said alcohol.

13. A bubble chewing gum base containing a substantially terpeneless flavoring of essential oil, which in its natural state contains terpenes having a deleterious action on said base.

14. A bubble chewing gum base containing an alcohol not deleterious to human beings and an essential oil.

15. A bubble chewing gum base containing an alcohol not deleterious to human beings, and a flavoring of essential oil, which in its natural state contains terpenes having a deleterious action on said base, of terpene content below that causing substantial deterioration of said base in the presence of said alcohol.

RICHARD P. DYCKMAN.